United States Patent [19]
Duhr et al.

[11] Patent Number: 6,086,021
[45] Date of Patent: Jul. 11, 2000

[54] ADJUSTABLE ANTI-ROTATIONAL FASTENER FOR WIRE HARNESS COMPONENTS

[75] Inventors: Jerome Adam David Duhr, Westland; Jeromy William Tomlin, Berkley, both of Mich.

[73] Assignee: Yazaki Corporation, Japan

[21] Appl. No.: 09/095,690

[22] Filed: Jun. 10, 1998

[51] Int. Cl.[7] .............................. F16L 3/00; F16L 3/08; F16B 15/00; A47B 96/06

[52] U.S. Cl. .............................. 248/73; 248/70; 248/71; 248/220.41

[58] Field of Search .............................. 248/68.1, 70, 71, 248/73, 74.3, 74.5, 220.41, 223.31; 411/510, 508, 509, 913; 24/297

[56] References Cited

U.S. PATENT DOCUMENTS 3,269,680  8/1966  Bryant ........................................ 248/73
3,550,219  12/1970 Van Buren, Jr. ........................... 248/73
5,209,441  5/1993  Satoh ....................................... 248/74.2
5,653,410  8/1997  Stroeters et al. ........................... 248/73

*Primary Examiner*—Derek J. Berger
*Assistant Examiner*—Dave Heisey
*Attorney, Agent, or Firm*—Young & Basile, P.C.

[57] ABSTRACT

An anti-rotational fastener for securing an electrical connector or other wire harness component to a surface having two holes formed therein. The fastener has a base which is attached to the connector, a first mounting stem fixed to the base, and a second mounting stem that can be locked to the base at any of several mounting positions to adjust the distance between the mounting stems. The fastener may thus be used with differently-spaced sets of mounting holes. The fastener is preferably formed with an integral flexible strap connecting the second mounting stem to the base so that the fastener may be molded as a single piece. The strap bends as necessary to allow the second mounting stem to be secured to the base in any one of the mounting locations.

18 Claims, 3 Drawing Sheets

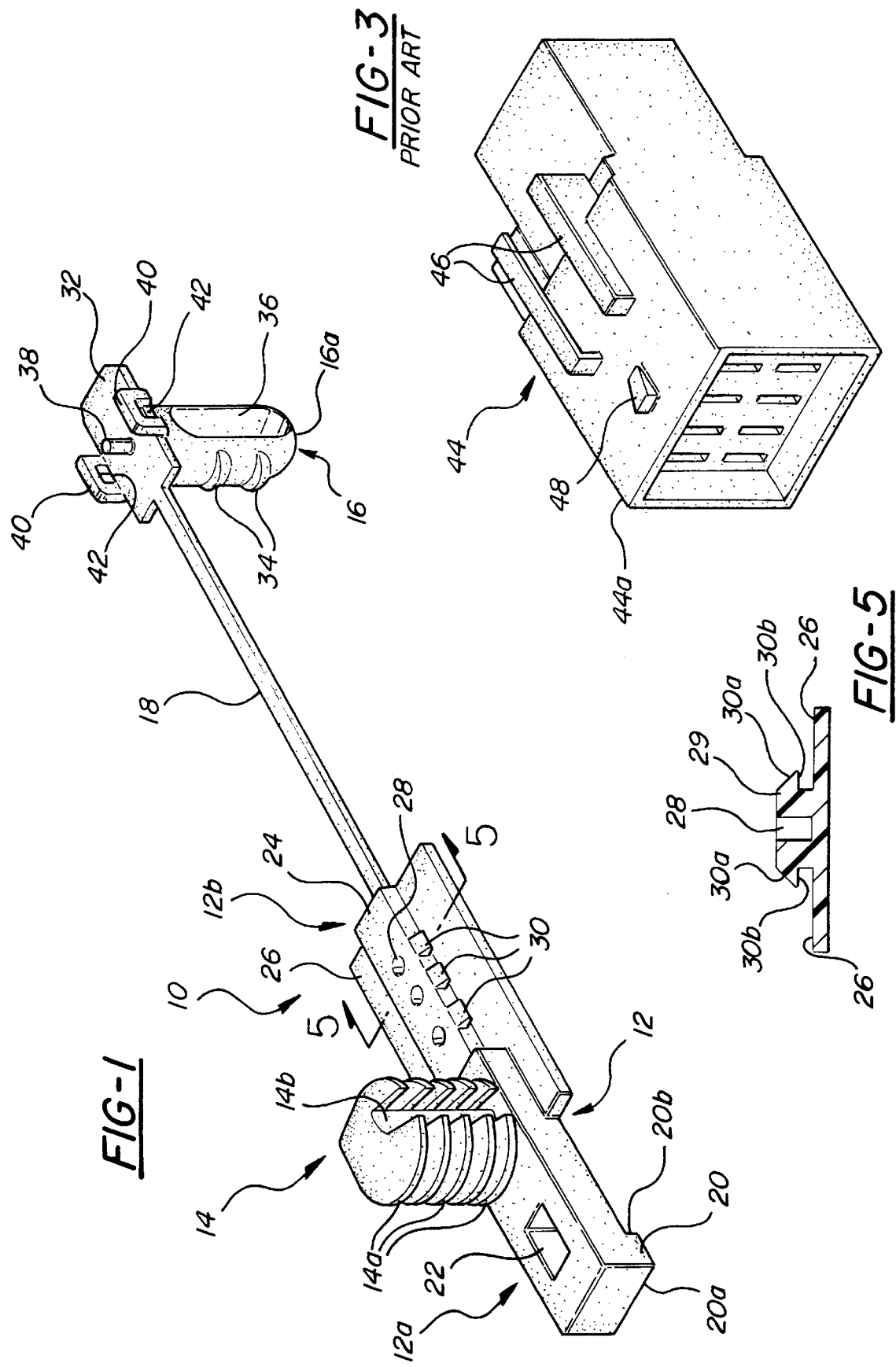

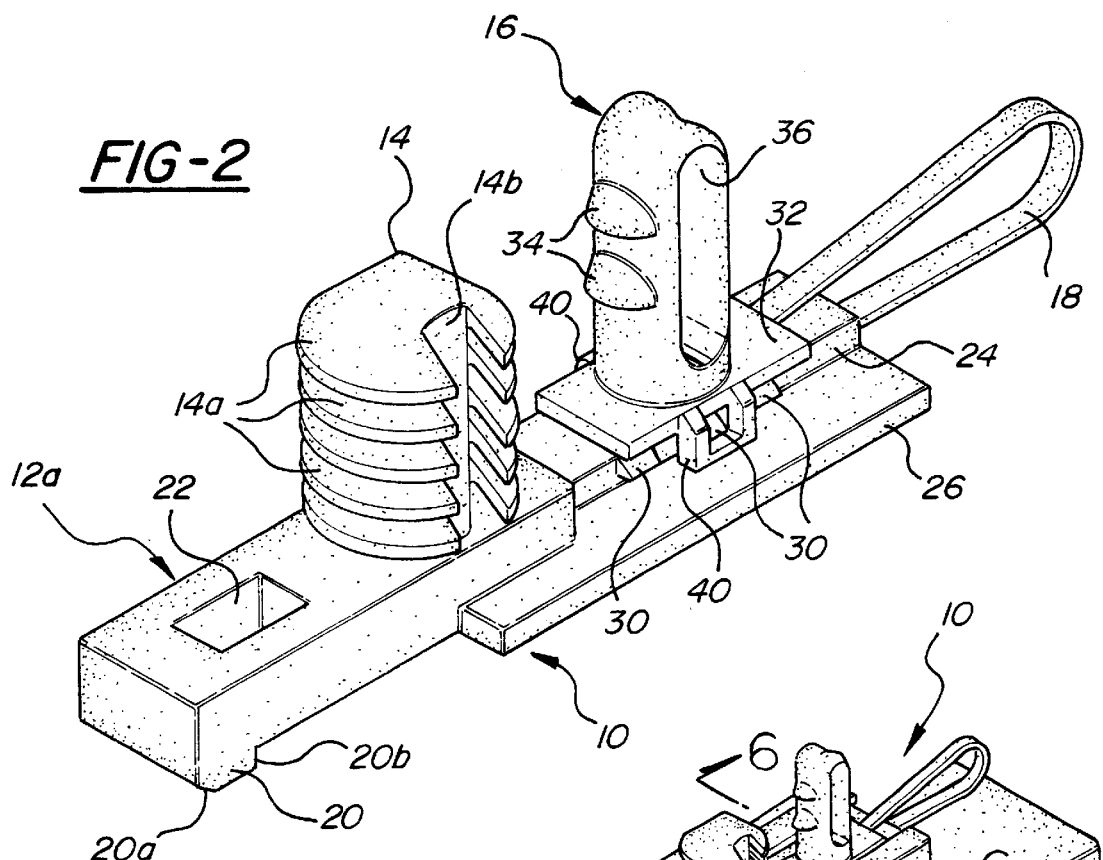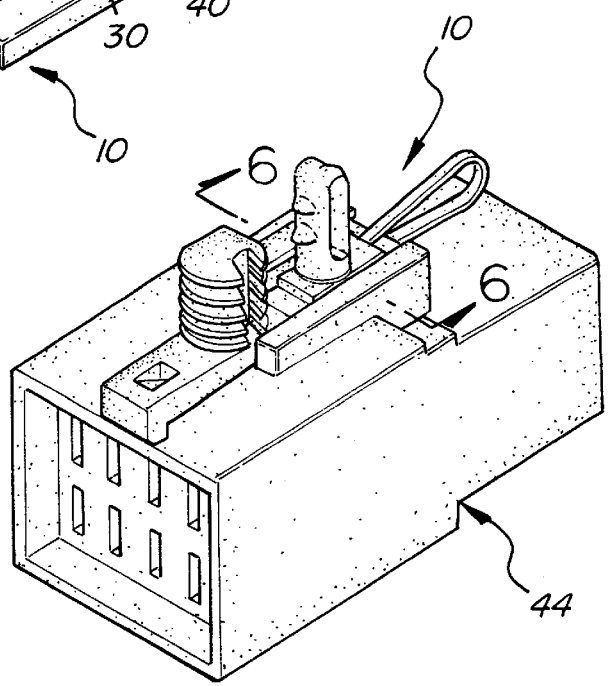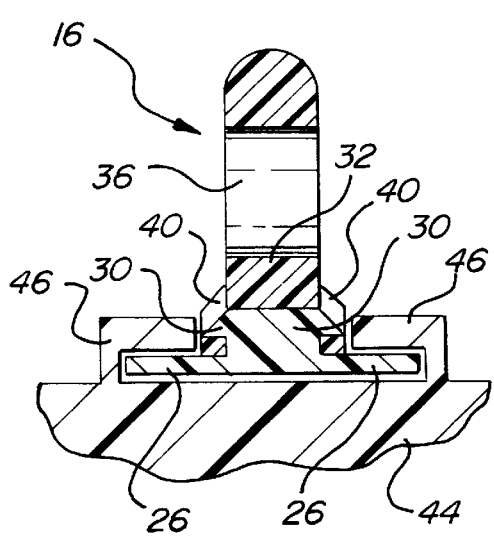

6,086,021

ADJUSTABLE ANTI-ROTATIONAL FASTENER FOR WIRE HARNESS COMPONENTS

FIELD OF THE INVENTION

This invention relates in general to fasteners which secure wire harness components such as electrical connectors to a surface by engaging a pair of mounting holes in the surface.

BACKGROUND OF THE INVENTION

Automotive vehicles and other machines having multiple electrical systems typically use wire harnesses to interconnect and supply power to the electrical systems. Such wire harnesses usually terminate in multi-pin electrical connectors which mate with other harnesses and/or electrical components. It is often necessary to secure an electrical connector at the end of a wire harness to some portion of the vehicle's structure, such as a sheet metal body panel. In certain installations, the connector must be secured to prevent its rotation relative to the panel. This is the case, for example, when a second connector must be mated with a first connector after the first connector is secured to a body panel, especially when the first connector is obstructed so that an assembly person must make the connection using only one hand, and/or when the assembly person's view of the connector is obstructed.

Such a rotation-resistant mounting is commonly achieved by providing two spaced holes in the panel, and by providing the connector with a fastener having a pair of projections or stems spaced to engage the holes in the panel. An example of such an anti-rotational fastener is disclosed in U.S. Pat. No. 5,324,151. In this patent, one of the fastener stems takes the form of what is commonly known as a "Christmas tree" clip, having resilient, conical barbs which flex inwardly when forced through a hole and then expand to resist being pulled out. The second fastener stem need only prevent the connector from rotating about the axis of the Christmas tree clip, and may therefore be referred to as an anti-rotation stud.

The various manufacturers of automotive vehicles and other wire harness-using machines have not settled upon a standard spacing between the mounting holes used to secure electrical connectors. Accordingly, a company wishing to supply anti-rotational fasteners to several such manufacturers must provide a variety of different fasteners with different spacing between the stems. This results in increased cost to the supplier of anti-rotational fasteners, since each different type of fastener requires separate tooling. This lack of standardization also complicates production decisions, since fasteners manufactured in anticipation of an order from a first manufacturer cannot be shipped to a second manufacturer if the two do not use fasteners having the same stem spacing.

SUMMARY OF THE INVENTION

In general the present invention is achieved with an anti-rotational fastener for an electrical connector or other wire harness component, in which the stem spacing is adjustable to adapt the fastener to differently-spaced sets of mounting holes.

In carrying out the present invention in an illustrative embodiment thereof, the fastener comprises a base for engagement with an electrical connector or similar wire harness component that is to be secured to a surface; a first mounting stem fixed on the base for insertion into a first mounting hole; and a second mounting stem capable of being connected to the base in any of a plurality of adjustable mounting positions which are sequentially spaced from the first mounting stem. Each of the adjustable mounting positions establishes a spacing between the first and second stems corresponding to a different mounting hole spacing. Accordingly, the second mounting stem may be secured to the base at different positions to produce a fastener compatible with any of several different mounting hole spacings.

According to a further feature of the invention, the fastener is injection molded as a single, integral part with a flexible strap or band connecting the second mounting stem to the base. The fastener is molded such that the base and the second mounting stem are separated from one another by the strap in an extended "at rest" position. The strap is flexible enough to allow the second mounting stem to be secured to the base in all of the adjustable mounting positions.

In a preferred embodiment of the invention, the first mounting stem comprises a push-in clip designed to resist being pulled out of the mounting hole, and the second mounting stem comprises an anti-rotation stud. If desired, however, both of the mounting stems may be push-in clips to provide a more secure mounting.

Also according to the preferred embodiment disclosed herein, the base of the fastener comprises a stud mounting platform extending from the first mounting stem toward the second mounting stem, the platform including the adjustable mounting positions along its length. Each mounting position is preferably further defined by a pair of latch projections extending outwardly from opposite sides of the platform, and a locator hole formed in the upper surface of the platform between the latch projections. In this embodiment the lower end of the second mounting stem includes a flat plate having a width approximately equal to the width of the upper surface of the mounting platform, a locator pin, and first and second latch tabs extending from opposite edges of the plate on either side of the locator pin. To connect the second stem to the fastener, a mounting position is selected on the base according to the spacing of the mounting holes on, for example, a vehicle body panel. The second stem is then flexed into position with the locator pin aligned over and then inserted into the locator hole for the selected mounting position. The stem latch tabs engage the latch projections on either side of the locator hole to lock the stem in place.

These and other features of the invention are disclosed in the following detailed description and drawings.

BRIEF DESCRIPTION OF THE DRAWINGS

FIG. 1 is a perspective view of a preferred embodiment of a fastener according to the present invention, with the second stem (an anti-rotation stud) in an at-rest position extended away from the fastener base;

FIG. 2 is a perspective view of the fastener of FIG. 1 with the anti-rotation stud secured in one fits mounting positions on the base;

FIG. 3 is a perspective view of a conventional wire harness electrical connector with which the fastener of the present invention can be used;

FIG. 4 is a perspective view of the connector of FIG. 3 with the inventive fastener attached;

FIG. 5 is a sectional view taken along the line 5—5 in FIG. 1;

FIG. 6 is a sectional view taken along the line 6—6 in FIG. 4;

DETAILED DESCRIPTION OF THE ILLUSTRATED EMBODIMENT

Figure 7:
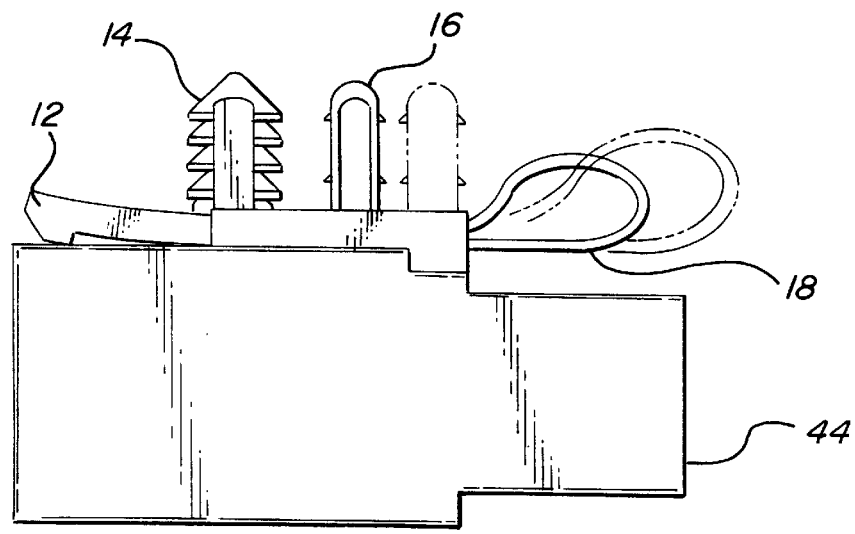
FIG. 7 schematically illustrates in side view the fastener of the present invention attached to a connector as shown in FIG. 4, with the anti-rotation stud in a first mounting position shown in solid lines, and in a second mounting position shown in phantom lines; and, FIG. 8 is a perspective, schematic illustration of a connector and inventive fastener combination such as that shown in FIG. 4, adapted to different mounting hole spacings by adjusting the position of the anti-rotation stud.

Referring to FIGS. 1 and 2, an adjustable anti-rotational fastener 10 according to the present invention comprises a base 12, a first mounting stem in the form of a push-in clip 14 on the base, a second mounting stem in the form of an anti-rotation stud 16, and a thin flexible strap 18 connecting anti-rotation stud 16 to base 12. The inventive fastener 10 is preferably molded in a single piece from a suitable plastic material, and is injection molded in an "at rest" configuration generally as shown in FIG. 1, wherein base 12 and anti-rotation stud 16 are spaced apart by strap 18 extending in a substantially straight, unflexed orientation with stud 16 "upside down" or reversed relative to clip 14.

In the illustrated embodiment of the invention, push-in clip 14 is a "Christmas tree" fastener of a type known in the fastener art, comprising a series of cone-shaped barbs 14a with vertical slots 14b extending along either side. The diameter of the barbs 14a is larger than the diameter of the mounting hole (FIGS. 7 and 8) into which the clip is adapted to be inserted, so that when the clip is urged into the hole the barbs flex inwardly, aided by slots 14b. Barbs 14a are sufficiently resilient to expand back to their original diameter after being forced through the mounting hole, and so resist being pulled out. The Christmas tree clip shown is but one of several types of push-in clips that are well known in the fastener art and are capable of being used in the present invention.

In this particular illustrated embodiment, base 12 is adapted for attachment to a connector of the type shown in FIG. 3. A first end 12a of the base has a lip 20 projecting downwardly therefrom. The lower leading edge 20a of the lip is bevelled, while the rear edge 20b of the lip is substantially perpendicular to the lower surface of base 12. A locking hole 22 is formed through base 12 adjacent the rear edge of lip 20. A second end 12b of the base comprises a stud mounting platform 24, illustrated as having a flat upper surface and a rectangular cross-section. Platform 24 is formed as part of a plate 26 whose edges project laterally on opposite sides of the fastener for a slide fit with the electrical connector in a manner described below.

Three locator holes 28 are formed in the upper surface of platform 24 in a preferably straight line extending away from clip 14. A pair of latch projections 30 is associated with each locator hole 28, extending laterally outward at positions corresponding to the locator holes. Each latch projection 30 has an angled upper surface 30a (see FIG. 5) slanting downwardly and away from the top of platform 24, and a lower horizontal surface 30b. Each locator hole 28 and its associated pair of latch projections 30 establishes a mounting position for anti-rotation stud 16, as will be described in further detail below.

Strap 18 connects stud 16 to the end of fastener base 12, and is sufficiently flexible to allow anti-rotation stud 16 to be rotated over into the mounting positions on base 12, as shown in FIG. 2. Fastener 10 is molded such that push-in clip 14 and stud 16 point in opposite directions when strap 18 is in the straight, at-rest position shown in FIG. 1.

The anti-rotation stud 16 has a rounded tip 16a at one end and a flat base plate 32 at the other end. A pair of bevelled teeth 34 extend from one side of stud 16, and a large aperture 36 is formed laterally through the body of the stud so that the stud is essentially hollow. A locator pin 38 extends from the approximate center of base 32. A pair of latch tabs 40 is formed on the edges of base 32 bracketing locator pin 38. Each latch tab 40 has an aperture 42 formed therethrough.

FIG. 3 depicts an example of a prior art multi-pin connector 44 with which fastener 10 may be used. A pair of rails 46 extends along an upper surface of the connector housing and a latch ramp 48 is positioned on the upper surface adjacent a first end 44a of the connector. The rails 46 have an inverted L-shape in cross-section and face one another.

Figure 8:
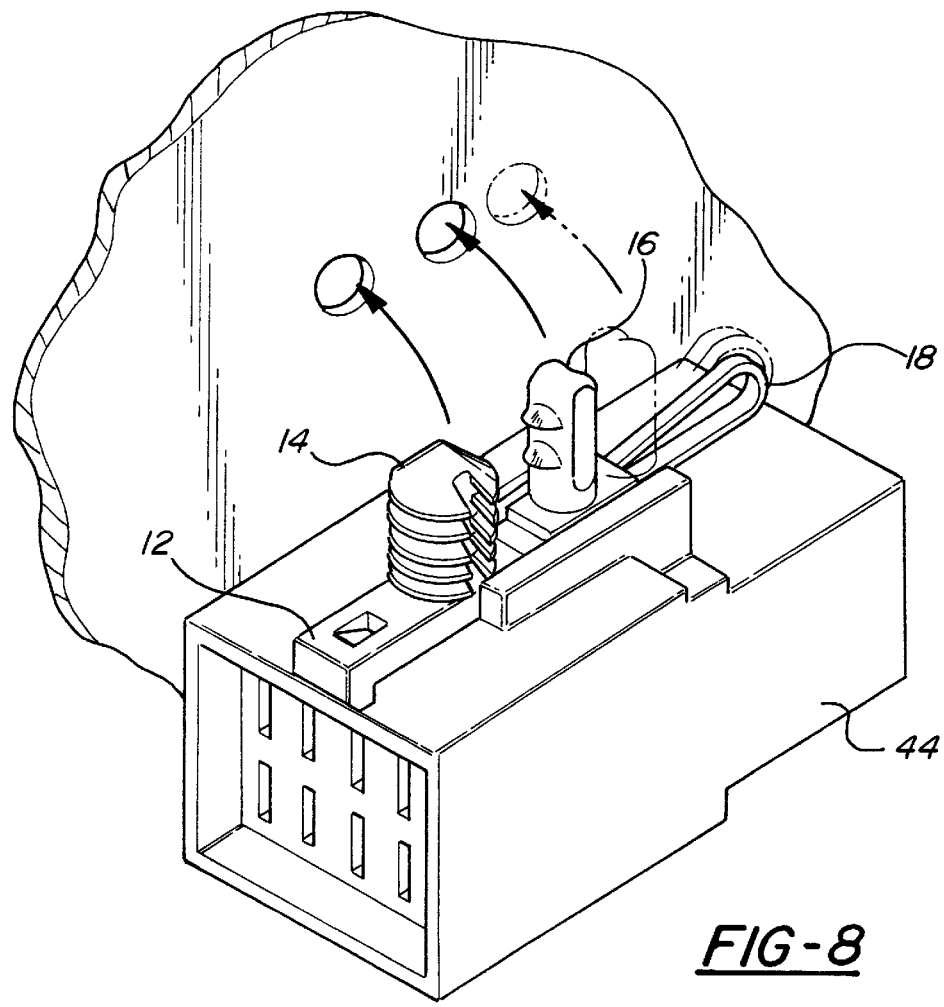

To connect anti-rotation stud 16 to base 12, a mounting position is selected according to the spacing of the mounting holes with which the fastener 10 is intended to mate (FIG. 8). Stud 16 is rotated around on strap 18 to a point over platform 24 such that its locator pin 38 is aligned with the appropriate locator hole 28. Anti-rotation stud 16 is then urged downwardly to insert locator pin 38 into the locator hole 28, and latch tabs 40 slide down over the sides of platform 24 and the associated pair of latch projections 30. As the anti-rotation stud 16 is urged further downwardly, latch tabs 40 flex outwardly to snap over latch projections 30. When anti-rotation stud 16 is completely seated on base 12, stud base plate 32 is seated flat against the upper surface of platform 24 and latch projections 30 engage apertures 42, thus securing the anti-rotation stud 16 in the selected mounting position.

After anti-rotation stud 16 has been secured to base 12 as described above and shown in FIG. 2, fastener 10 is attached to connector 44 by sliding fastener 10 between rails 46 in an end-wise direction such that the edges of plate 26 are trapped beneath rails 46 as seen in FIG. 4. When the leading end 12a of the base meets latch ramp 48, bevelled lower edge 20a of the lip forces base 12 to ride upwardly over ramp 48. Base 12 is sufficiently flexible to bend as it rides up over ramp 48, then snap back downwardly such that the ramp fits into locking hole 22 to securely retain fastener 10 on the connector 44.

As best shown in FIG. 6, the horizontal distance between the innermost edges of rails 46 is just large enough to permit passage therebetween of latch tabs 40 when anti-rotation stud 16 is latched onto platform 24 at one of the mounting positions. When stud 16 is snapped onto platform 24 and fastener 10 slides between rails 26, minimal clearance exists between the outer surfaces of latch tabs 40 and the inner edges of rails 46, preventing latch tabs 40 from accidentally being released from engagement with their respective latch projections 30. Engagement of fastener 10 with connector 44 thus locks anti-rotation stud 16 on base 12. Accordingly, the desired spacing between push-in clip 14 and anti-rotation stud 16 must be determined and the stud inserted into the appropriate mounting position before fastener 10 is secured to connector 44.

While the illustrated embodiment shows a fastener with three stud mounting position options, a fastener according to the present invention may have more than three or as few as two mounting positions for anti-rotation stud 16, depending on the overall length of the fastener and other space considerations known to those skilled in the art.

Referring next to FIGS. 7 and 8, a fastener 10 according to the present invention is illustrated schematically to show the different mounting position options for anti-rotation stud 16. FIG. 7 illustrates different positions of stud 16 and different degrees of bend or flexure of connecting strap 18 in solid and phantom lines. It will be understood by those skilled in the art, and clear from the foregoing description, that fastener 10 can be reused for different mounting applications, and the position of stud 16 adjusted among the various mounting positions on platform 24, by simply removing fastener 10 from connector 44 and releasing latch tabs 40 to pull the stud out of one locator hole and lockingly inserting it into another. FIG. 8 schematically illustrates the adjustment of stud 16 to accommodate the different spacing of different sets of mounting holes 100 in a mounting surface such as vehicle body panel 101.

While the invention has been described in connection with what is presently considered to be the most practical and preferred embodiment, it is to be understood that the invention is not to be limited to the disclosed embodiments but is intended to cover various modifications and equivalent arrangements included within the spirit and scope of the appended claims. For example, while a slide-mounted fastener base 12 is illustrated for connectors such as 44, it will be apparent to those skilled in the art that base 12 and the inventive adjustable anti-rotation stud structure can be modified to be attached to different types of wire harness components, or even to the wire harness itself. Also, while a preferred form of stud-mounting structure is illustrated (latch projections 30, locator holes 28 and pin 38), other known snap- or press-fit structure could be used without departing from the broader scope of the invention.

The invention claimed is:

1. An adjustable fastener adapted to secure a wire harness component in an anti-rotational manner to surfaces having differently-spaced sets of two holes formed therein, the fastener comprising:
   a base adapted to be secured to the component;
   a first mounting stem on the base adapted for insertion into a first of two holes;
   a second mounting stem adapted for insertion into a second of two holes and having means for lockingly engaging the base; and
   a plurality of mounting positions on the base, each mounting position being adapted to lockingly receive the second mounting stem, each mounting position being spaced differently from the first mounting stem to adapt the fastener to one of the sets of two holes.

2. A fastener according to claim 1, wherein the second mounting stem is attached to the base.

3. A fastener according to claim 2, wherein the second mounting stem is attached to the base with a flexible strap.

4. A fastener according to claim 3, wherein the base, the first mounting stem, the second mounting stem and the strap are integrally molded from a plastic material.

5. A fastener according to claim 1 wherein the first mounting stem comprises a push-in clip having a self-expanding head and the second mounting stem comprises an anti-rotation stud.

6. A fastener according to claim 1, wherein the means for lockingly engaging the base comprise a first latch member, and the mounting positions on the base each comprise a second latch member disposed on the base and defining the plurality of different positions, the first latch member being engageable with any one of the second latch members.

7. A fastener according to claim 6, further comprising means on the base adapted for engaging the component to secure the fastener to the component, and wherein the second latch members are disposed on the base such that the first latch member is adapted to be maintained in engagement with the second latch member to which it is engaged by the component when the fastener is secured to the component.

8. A fastener according to claim 6, wherein the means for lockingly engaging the base further comprises a locator pin projecting from a lower surface of the second mounting stem, and the mounting positions on the base each further comprise a locator hole for receiving the locator pin.

9. A fastener according to claim 6, wherein the base comprises a rectangular mounting position platform having first and second parallel lateral surfaces, and at least one of the plurality of second latch members comprises first and second projections extending from the respective first and second lateral surfaces of the platform, and the first latch member comprises first and second latch tabs spaced on the second mounting stem to fit over the respective lateral surfaces of the platform and having apertures for engagement with the respective projections.

10. An adjustable fastener adapted to secure a wire harness component in an anti-rotational manner to surfaces having differently-spaced sets of two holes formed therein, the fastener comprising:
    a base adapted to be secured to the component;
    a first mounting stem on the base adapted for insertion into a first of two holes;
    a second mounting stem adapted for insertion into a second of two holes and having means for lockingly engaging the base in one of a plurality of mounting positions on the base, each mounting position being adapted to lockingly receive the second mounting stem, each mounting position being spaced differently from the first mounting stem to adapt the fastener to one of the sets of two holes, wherein the means on the second mounting stem for lockingly engaging the base and each mounting position comprises complementary axial locking structure with which the second mounting stem is axially locked to the mounting position, the second mounting stem being attached to the base by a flexible connector strap.

11. A fastener according to claim 10, wherein the flexible strap has a first end attached to the base, and a second end attached to the second mounting stem.

12. A fastener according to claim 11, wherein the flexible strap has an at-rest position in which its second end extends away from the fastener base.

13. A fastener according to claim 12, wherein the first mounting stem is oriented generally upwardly on a first side of the fastener base, and the second mounting stem is oriented generally downwardly on the end of the flexible strap when the flexible strap is in its extended, at-rest position, such that rotation of the second mounting stem on the strap from its at-rest position to a mounting position on the fastener base reverses the orientation of the second mounting stem to the generally upward orientation of the first mounting stem.

14. A fastener according to claim 13, wherein each of the mounting positions is defined on an elongated platform portion on the base, the platform having a width approximating the width of a base portion of the second mounting stem and a length capable of defining at least two mounting positions comprising a locator hole and a pair of lateral latch projections aligned with the hole, the second mounting stem base portion further including a pair of latch projection-engaging members having a spacing approximating the width of the mounting position platform, the base portion of the second mounting stem further including a locator pin between the latch-engaging projections.

15. A fastener according to claim 14, wherein the mounting position platform portion of the fastener base further includes a connector engaging surface on each side of the platform associated with the mounting position latch projections, the connector engaging surfaces adapted to engage a portion of a connector such that the connector portion prevents the disengagement of the second mounting stem from the platform latch projections.

16. In combination, a wire harness type electrical component and a fastener adapted to be secured to the component, the fastener being adapted for attaching the component to a surface having first and second holes formed therein, the fastener having a base, a first mounting stem projecting from the base adapted for insertion into the first hole, and a second mounting stem projecting from the base and spaced from the first mounting stem and adapted for insertion into the second hole, the fastener characterized in that the second mounting stem is adapted to lockingly engage each of a plurality of second stem mounting positions defined on the fastener base and spaced at different distances from the first mounting stem corresponding to different distances between different sets of first and second holes.

17. A fastener according to claim 16, wherein the second mounting stem is integrally molded with the base and first mounting stem, connected to the base by a flexible strap having a length sufficient to allow the second mounting stem to be moved between the plurality of mounting positions on the base.

18. A fastener according to claim 17, wherein the base includes component engaging structure associated with the plurality of mounting positions such that the component prevents the disengagement of the second mounting stem from a mounting position on the base when the base is attached to the component.

* * * * *

UNITED STATES PATENT AND TRADEMARK OFFICE
CERTIFICATE OF CORRECTION

PATENT NO : 6,086,021
DATED : July 11, 2000
INVENTOR(S): Jerome Adam David Duhr & Jeromy William Tomlin It is certified that error appears in the above-identified patent and that said Letters Patent are hereby corrected as shown below:

Column 2, Line 56 delete "one fits" and insert -- one of its --

Signed and Sealed this

Twenty-second Day of May, 2001

Attest:

NICHOLAS P. GODICI

*Attesting Officer*  *Acting Director of the United States Patent and Trademark Office*